Patented June 25, 1940

2,205,872

UNITED STATES PATENT OFFICE 2,205,872

IODIZED SALT

Robert E. Berry, San Leandro, Calif., assignor to Morton Salt Company, Chicago, Ill., a corporation of Illinois No Drawing. Application January 27, 1938, Serial No. 187,219

14 Claims. (Cl. 99—143)

This invention relates to the incorporation and distribution of additive ingredients with a dry granular material and more particularly to the production of iodized salt.

It is a further object to provide a method of incorporating a small quantity of additive material into and throughout a larger mass of dry granular material of different characteristics such that an effectively homogeneous intermixture of one material with the other is initially secured and maintained throughout the handling of the mixture.

It is a further object to provide as a new process of incorporating an additive material in relatively small quantity into and throughout a much larger bulk of dry granular material, a simple and highly effective method whereby the additive material is first incorporated in predetermined quantity into a part of the material, and this portion then uniformly intermixed with the main bulk of the material.

It is a further object to provide a simple and effective method of incorporating a chemical material such as an iodine compound into and throughout a mass of salt crystals in such manner as to produce and maintain a uniform and homogeneous distribution adapted to resist the tendency to segregate as a result of handling during use.

It is a further object to provide a process for the controlled incorporation of a predetermined quantity of an iodine compound into and throughout a mass of salt crystals containing a drier in such manner as to secure a uniform and homogeneous distribution in the dry body of the salt capable of withstanding the tendency to segregate as a result of handling during use.

It is a further object to provide as a new product, an iodized, noncaking, salt in which the iodine constituent is uniformly distributed throughout the salt crystals in such manner that a homogeneous product is maintained during use.

Other objects and advantages will be apparent from the following description and the appended claims.

In the manufacture of salt for general domestic consumption it is desired to incorporate certain added materials in addition to the sodium chloride crystals, for developing predetermined characteristics in the final product. An important material of this character is iodine which is added in predetermined quantity as a medicinal agent, the salt thus iodized being distributed generally, and particularly in those portions of the country where the normal diet is lacking in the proper iodine content. The iodine is usually added in the form of an alkali metal salt, the preferred compound being potassium iodide. Very minute amounts of iodine are effective for securing the desired results therapeutically, and it thus becomes important to provide for incorporating homogeneously into the mass of salt, these very minute quantities of the iodine compound. For example, the quantities customarily desired for this purpose are of the order of .02% to .03% of potassium iodide, as based upon the weight of the salt to which it is added. While the quantities of iodine, or other compounds desired to be added may vary substantially from the above, this proportion is indicative of an extremely small proportion range of materials of this character which are desired to be added, and which present peculiar difficulties in regard to uniformity and homogeneity of distribution.

Being a material of much greater specific gravity than the salt itself, considerable difficulty is normally encountered in securing and maintaining a proper and uniform intermixture of the added compound with the salt crystals. Where merely mixed in the dry state with the salt crystals in a bin, preparatory to packaging, it becomes difficult to secure and maintain a uniform incorporation of the iodine compound into and throughout the mass of salt. And the segregating effects which take place as a result of the normal handling operations of the mixture incident to its packaging, shipment, and use, are such as to further seriously interfere with the maintenance of proper and uniform distribution of the iodine with the salt crystals. Even the handling of the materials on a continuous flowing basis with elimination of storage periods, while resulting in some improvement, was found to produce results not entirely satisfactory.

In the individual containers, such as those furnished to the consumer, a similar objectionable lack of uniformity was found to occur, the salt at the top of the container being deficient in the desired quantity of iodine, and that lower in the package containing in excess of the desired quantity.

In accordance with the present invention, a process is provided for securing incorporation of the added alkali metal iodine compound in uniform manner into and throughout the body of salt crystals, and of maintaining such homogeneous distribution throughout the period of use of the salt. Thus an efficient utilization of the iodine material is accomplished, and provision is made for proper uniformity in the salt as used, so that there is substantial homogeneity as to iodine content, in all portions of the body of salt. For this purpose the iodine is fixed with respect to a portion of the salt itself, so that the iodine will remain in physically intact relation with that portion of the salt crystals. This is conveniently effected by localizing and attaching the iodine compound in and upon the surface of the salt crystals of a part of the main bulk of the salt. The application of the iodine to the salt crystals is effected under such controlled conditions as to avoid materially altering the physical characteristics of the treated portion of salt crystals as regards appearance and tendency to segregate from a mixture with untreated crystals. This treated portion is then returned in predetermined proportion to the main bulk, and uniformly intermixed therewith, with little or no tendency for the treated crystals to separate themselves from the untreated crystals. And regardless of the degree of agitation or handling to which the main bulk of the salt is subjected as a result of shipping, or use, this homogeneous distribution as initially effected is effectively maintained, and provision is thus made for assuring substantially complete uniformity throughout the mass of salt at all times during use.

The fixation of the iodine material with respect to the crystals of the portion of the salt is preferably accomplished by a wet mixing process. An aqueous solution of the iodine compound is made up, preferably at or approaching a condition of saturation, to thereby avoid adding unnecessary quantities of water. This solution is then added to sodium chloride crystals, preferably while the latter are being stirred so that the solution wets and covers the entire mass of salt crystals. The result is to form a coating of the iodine compound in and upon the surface of the salt crystals, the iodine thus being deposited and fixed with respect to the crystals. By properly effecting the treatment of the crystals, the appearance and other physical characteristics thereof are not materially altered. The treated crystals may be subjected to a controlled drying action such as to reduce the moisture therein while avoiding packing or caking action of the crystals, or may be utilized directly without preliminary drying.

In the preparation of salt for domestic utilization it is important that provision be made to avoid the tendency of the salt crystals to cake together under the action of dampness, excess humidity and the like. To avoid objectionable caking action of the salt, certain materials have been incorporated which have the property of inhibiting this caking action and of checking the caking under adverse moisture conditions. A material having characteristics suitable for this purpose is basic magnesium carbonate, a material which in the dry state is a finely divided light and fluffy white powder. When present in quantities of the order of 1% based on the weight of the salt, it has been found to effectively control the caking tendency of the salt crystals, and to render the salt noncaking over a much wider range of moisture conditions than would otherwise be the case.

A drier material such as magnesium carbonate, being light and fluffy, does not readily mix with nor remain in uniform distribution with respect to a relatively heavy material such as potassium iodide. In practicing the present invention it is found preferable to separately incorporate the drier material and the iodine material with the salt crystals, the drier being added preferably to the untreated portion of the salt. The treated portion of the salt, to which the solution of iodine compound is added, is then added to and uniformly incorporated with the main body of the crystals, producing a maintainable uniformity of distribution of the treated crystals throughout the mass of untreated crystals.

By adding potassium iodide to the salt crystals in concentrated solution, of or near saturation, it is found that the quantity of added water thus incorporated is actually negligible as regards creating a caking problem when considered on the basis of the entire mass of the salt. This quantity is within the capability of the drier material to absorb without resulting in objectionable caking of the salt crystals, and evaporation of moisture as a separate step is not required. For example very satisfactory results have been secured utilizing a solution of potassium iodide containing 10 pounds of potassium iodide dissolved in 9 pounds of water. Thus it will be clear that when the final salt mixture is prepared to contain the predetermined desired proportion of potassium iodide of the order of .02% to .03%, the added water will be present in approximately .02% or less; this amount being quite minute with respect to the bulk of salt, is readily absorbed by the drier, and prevented from causing objectionable caking action.

The iodine compound is added to the portion of salt to be treated in predetermined controlled proportions so that when this portion of the salt is remixed with the main bulk thereof, the additive material will be present in the desired quantity with respect thereto. The quantity of additive materials incorporated upon and attached to the treated portion of the salt may be varied as desired, corresponding variation being made in the proportion of the total bulk of salt mixture which is represented by the treated portion, in order to secure the desired proportions of iodine compound therein. Very satisfactory results in operation have been secured where the iodine solution containing 10 pounds of potassium iodide dissolved in 9 pounds of water, was added to 450 pounds of sodium chloride crystals. It will be understood however that the ratio between the quantity of added potassium iodide and the treated salt crystals may be varied substantially, as desired.

Following the treatment of the salt crystals with the potassium iodide solution, incorporating and attaching a coating of potassium iodide into and upon the surface of such crystals, this treated fraction is then incorporated with a predetermined quantity of untreated sodium chloride crystals containing a drier material as above described. As an example, and in order to produce a theoretical analysis of .0236% potassium iodide in the final mixture, it required approximately 8¼ pounds of the treated fraction to be added to 675 pounds of untreated salt crystals. Within this mass of untreated crystals, there was incorporated the drier material, magnesium basic carbonate in the amount of approximately 7 pounds, thereby producing a final proportion of such drier material of the order of 1%.

It has been observed that under certain conditions there was a tendency for the iodine compound to decompose, resulting in some discoloration of the salt taking place during use. It has been found that the addition of a small quantity of material of alkaline reaction such as sodium carbonate or sodium bicarbonate is effective in checking this tendency, and for this purpose a predetermined quantity of material of this character is preferably added to the treated portion of the salt mass. For example, where 35 pounds of sodium bicarbonate was added to the treated portion comprising 450 pounds of salt as above described, an improvement in the tendency of the salt toward discoloration was obtained. The alkaline material is preferably added to the treated salt crystals following the incorporation of the iodine solution therewith, to secure proper uniformity of distribution and avoiding the balling of the sodium bicarbonate. The quantity of added sodium bicarbonate is given merely as an example, as it will be understood that this material, or other similarly acting materials, may be incorporated with either the treated portion or with the untreated portion in varying quantities. It is also found desirable as reducing the tendency of the iodine compound to decompose, to dry the treated salt crystals before incorporation with the untreated fraction thereof.

It will thus be observed that the final mixture as thus produced includes iodized-coated salt crystals uniformly incorporated throughout a larger mass of uncoated salt crystals, through which there is distributed a drier material, capable of readily compensating for such moisture as added to the treated crystals incident to the attaching of the iodine thereto. A typical analysis of the final product incorporating the above mentioned ingredients may be represented approximately as follows:

| | Per cent |
|---|---|
| Potassium iodide | .0236 |
| Water | .0213 |
| Sodium bicarbonate | .0827 |
| Magnesium carbonate | 1.0603 |
| Salt | 98.8121 |

With the proportions of ingredients described above, the treated mass of salt may be considered as a uniform intermixture of treated and untreated crystals in the relative proportion of approximately 1 to 87. This proportion is given as illustrative only, as it will be clear that the ratio between treated and untreated portions may be varied substantially while still retaining the desired final analysis. In cases where the presence of additional quantities of water is not objectionable, or does not give rise to problems of caking or the like, a much larger proportion, or even the entire quantity of the granular material may be treated with the solution of additive material. Generally however in order to avoid the addition of unnecessary quantities of moisture such as present problems of caking in the treatment of the salt crystals, it is found desirable to treat a minor portion of the salt with a more or less concentrated solution of additive material and to return such treated portion for intermixture with the major untreated portion, the preferred procedure being to utilize proportions substantially of the order of those described above.

By the practising of this method therefore there is secured a highly successful incorporation, in a homogeneous and uniform manner, of the added chemical materials into and upon the mass of the salt crystals. The preliminary formation of the treated mass of crystals is accomplished simply and inexpensively, and with assurance that under all conditions of handling during shipment and use, the initial uniform incorporation and distribution will not be adversely affected. Assurance is provided that all portions of the salt when produced in accordance with the present method will have the desired uniformity as to iodine content, test runs of a large number of packages of salt produced in accordance with the present invention showing maximum variations of only a few thousandths of a percent.

While the process and product herein described constitute preferred embodiments of the invention, it is to be understood that the invention is not limited to this precise process and product, and that changes may be made therein without departing from the scope of the invention which is defined in the appended claims.

What is claimed is:

1. A process for producing an iodized salt having uniform and homogeneous characteristics which comprises treating a small portion of the salt crystals with a concentrated solution of potassium iodide dissolved in water to attach the iodine compound in definite proportion thereto while retaining substantially the original physical characteristics of the treated crystals, and thereafter uniformly intermixing said treated salt crystals with a controlled large quantity of untreated salt crystals in the proportion of the general order of 1 treated crystal to 87 untreated crystals to provide a mixed mass of crystals of similar physical characteristics as regards tendency to segregate in use and with the treated crystals in such relative quantity as to incorporate a predetermined proportion of iodine present as potassium iodide with respect to the entire mass of salt.

2. As a new product, free-flowing iodized salt comprising a mass of salt crystals of which a relatively small proportion has an iodine compound consisting of potassium iodide fixed thereon and which incorporates substantially a minimum quantity of aqueous solvent for said compound, each of such treated crystals having a relatively rich deposit of potassium iodide thereon and retaining essentially the physical characteristics of salt crystals, the number of such treated crystals being controlled with respect to the number of untreated crystals so as to provide the desired proportion of the order of .02% to .03% of iodine compound present as potassium iodide upon the entire mass of salt with a negligible addition of solvent thereto.

3. A process for producing a uniform and homogeneous iodized noncaking salt which comprises separating out a portion of the salt crystals, treating the separated portion with a solution of an iodine compound consisting of potassium iodide dissolved in substantially the minimum quantity of aqueous solvent to fix the iodine compound upon the crystals without materially altering the physical characteristics thereof, thereafter intermixing said remaining portion with the treated portion in predetermined controlled quantity, and incorporating with said salt a drier material adapted to reduce the caking tendency of the salt and to provide a free-flowing salt, the drier providing for absorbing the solvent added to said treated portion.

4. A process for the production of a uniform intermixture of iodized salt which comprises dissolving an iodine compound capable of being maintained in a stable condition during use in water to form a concentrated solution thereof in the water, treating a portion of the salt crystals with said concentrated solution dissolved in water while retaining essentially the physical characteristics of the treated salt crystals as such, thereafter returning the treated portion of the salt crystals to the main bulk thereof in predetermined controlled proportions such as to provide the desired quantity of iodine with respect to the entire mass of the salt and with the treated crystals being substantially free of segregating tendency in the presence of the untreated crystals during use, and adding an alkaline stabilizing material to said treated portion of a character adapted to prevent decomposition of the iodine compound.

5. A process for producing an iodized salt of the character described which comprises forming a concentrated solution in water of potassium iodide, treating salt crystals with said concentrated solution to uniformly apply said potassium iodide to the salt crystals while maintaining essentially the physical characteristics of said crystals as such, and adding said treated crystals to untreated crystals in predetermined proportion such as to obtain an iodine content in the mixed mass of salt crystals of approximately .02% to .03% present as potassium iodide.

6. A process for producing a stable iodized salt of the character described which comprises treating salt crystals in the proportion of approximately four hundred and fifty pounds of salt with an aqueous solution containing of the order of ten pounds of potassium iodide dissolved therein, and adding said treated crystals to untreated crystals in predetermined proportion such as to obtain an iodine content present as potassium iodide in the mixed mass of crystals of approximately .02% to .03% of potassium iodide.

7. A free-flowing iodized salt of the character described comprising a mass of salt crystals of which a predetermined minor portion contains a coating of potassium iodide thereon and an aqueous solvent for said potassium iodide substantially of the same order of quantity thereof, said coated crystals being uniformly distributed throughout the remaining uncoated crystals in predetermined proportion of the order of approximately one coated crystal to 87 uncoated crystals to produce the desired content of iodine in the form of potassium iodide in the mixed mass of crystals, said coated crystals having substantially similar physical properties as regards tendency to segregate as the uncoated crystals and maintaining substantially uniform distribution in use.

8. A free-flowing iodized salt of the character described comprising a mass of salt crystals of which a predetermined minor portion contains a coating of iodine compound thereon and substantially a minimum quantity of aqueous solvent for said potassium iodide, said coated crystals being uniformly distributed throughout the remaining uncoated crystals in predetermined proportion to produce an iodine content of the order of .02% to .03% present as potassium iodide in the mixed mass of crystals and a solvent content not substantially in excess of the same amount, said coated crystals having substantially similar physical properties as regards tendency to segregate as the uncoated crystals and maintaining substantially uniform distribution in use.

9. An iodized salt of the character described comprising a mass of salt crystals of which a predetermined small part of the order of 1 part in 87 contains a coating of potassium iodide thereon, said coated crystals being uniformly distributed throughout the remaining uncoated crystals in predetermined proportion to produce the desired content of iodine compound of the order of .02% to .03% in the mixed mass of crystals and present as potassium iodide, and a small quantity of the order of 1% of magnesium carbonate as a drier also distributed uniformly through the mass.

10. In a process for producing an iodized salt of the character described the step comprising treating salt crystals with a substantially concentrated aqueous solution of potassium iodide to provide a deposit of said iodine compound present as potassium iodide upon the salt crystals in the approximate proportion of 10 pounds of potassium iodide to 450 pounds of salt crystals while maintaining essentially the physical characteristics of the original salt crystals.

11. A process for producing an iodized salt of the character described which includes the step of treating salt crystals with a substantially concentrated aqueous solution of an iodine compound in the approximate proportion of 10 pounds of potassium iodide dissolved in 9 pounds of water and added to 450 pounds of salt crystals, and agitating and drying said salt crystals to provide a deposit of said iodine compound present as potassium iodide upon the salt crystals while maintaining the crystalline characteristic thereof.

12. A process for producing a free-flowing iodized salt of the character described which comprises treating a minor portion of the salt crystals with a substantially concentrated solution of potassium iodide in water in the proportion of approximately 10 pounds of potassium iodide dissolved in 9 pounds of water and applied to 450 pounds of salt crystals to provide a relatively rich deposit of potassium iodide on such treated crystals with a small quantity of solvent while retaining essentially the physical characteristics of the treated crystals as such, thereafter returning the treated portion of the salt to the main bulk thereof in approximately the proportion of 1 treated crystal to 87 untreated crystals to provide an iodine content in the mixed mass of salt crystals of approximately .02% to .03% present as potassium iodide, and moisture not substantially in excess of the same quantity, and incorporating with the salt crystals approximately 1% of a drier having a drying capacity such as to effectively control the caking tendency of the salt in the presence of such added moisture.

13. As a new product, free-flowing stable iodized salt comprising a mass of salt crystals of which a relatively small proportion has an iodine compound consisting of potassium iodide fixed thereon and which incorporates substantially a minimum quantity of water as a solvent for said compound, the number of such treated crystals being controlled with respect to the number of untreated crystals so as to provide the desired proportion of the order of .02% to .03% of iodine compound present as potassium iodide upon the entire mass of salt with a negligible addition of solvent thereto, a drier material incorporated with said mass of salt having the property of absorbing moisture in an amount in excess of the quantity of said added solvent, and an alkaline stabilizer material effective to stabilize the potassium iodide against its tendency to decompose.

14. A process for producing a free-flowing iodized salt of the character described which comprises adding potassium iodide to water to form a substantially concentrated solution of the potassium iodide in the water, adding that solution in predetermined quantity to salt crystals in such proportion that the solution is distributed over and absorbed upon the crystals to produce a rich deposit of potassium iodide thereon while retaining essentially the physical characteristics of the salt crystals as such, and thereafter incorporating said treated crystals in uniformly distributed manner into a larger mass of salt in predetermined proportion to provide the desired final proportion of iodine as potassium iodide thereon, said treated crystals having such similar physical characteristics to the untreated crystals that the distribution thereof through the main mass of the salt is effectively maintained during use.

ROBERT E. BERRY.